US008411388B2

United States Patent
Kwon

(10) Patent No.: US 8,411,388 B2
(45) Date of Patent: Apr. 2, 2013

(54) PARTIAL RIB EXTENDING FROM A HUB

(75) Inventor: Haesung Kwon, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 15 days.

(21) Appl. No.: 12/903,032

(22) Filed: Oct. 12, 2010

(65) Prior Publication Data

US 2012/0087038 A1  Apr. 12, 2012

(51) Int. Cl.
G11B 33/08 (2006.01)
(52) U.S. Cl. .................................................. 360/97.01
(58) Field of Classification Search ............... 360/97.01
See application file for complete search history.

(56) References Cited

U.S. PATENT DOCUMENTS

| 6,629,359 B2 * | 10/2003 | Choi | 29/729 |
| 6,947,252 B2 * | 9/2005 | Kang et al. | 360/97.02 |
| 2002/0181151 A1 * | 12/2002 | Obata et al. | 360/99.08 |
| 2006/0232878 A1 * | 10/2006 | Saruta | 360/97.01 |
| 2006/0268451 A1 * | 11/2006 | Kikuchi | 360/97.01 |
| 2010/0232059 A1 * | 9/2010 | Choi | 360/97.02 |
| 2010/0232064 A1 * | 9/2010 | Lim et al. | 360/129 |

* cited by examiner

*Primary Examiner* — Mark Blouin
(74) *Attorney, Agent, or Firm* — Braden Katterheinrich

(57) ABSTRACT

A hard disk drive and a disk base are disclosed with the disk base including a first face configured to form a disk cavity for the spindle motor, disk(s) and a voice coil motor and a second face configured to couple with a controller Printed Circuit Board (PCB) including at least one integrated circuit. Both faces are include a hub for mounting the spindle motor and surrounded by an outer wall. The first face and/or the second face include at least one partial rib extending from the hub or the outer wall partway to the other. The partial ribs are configured to position the integrated circuit and stiffen the disk base and hard disk drive from mechanical shocks, such as dropping the unit including the hard disk drive. A handheld device is disclosed including at least one of the disclosed hard disk drives with improved reliability to mechanical shocks.

11 Claims, 7 Drawing Sheets

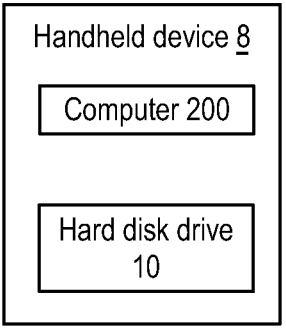
Fig. 6A
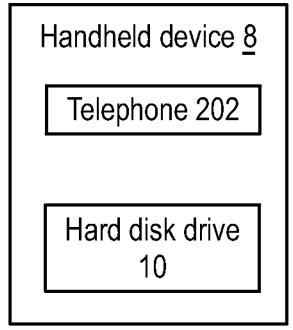
Fig. 6B
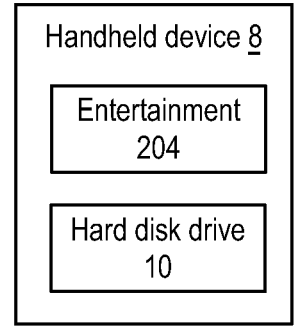
Fig. 6C
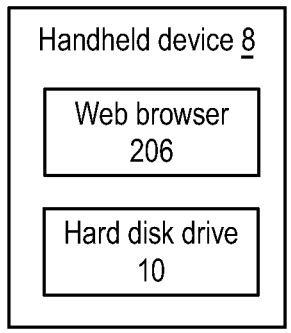
Fig. 6D
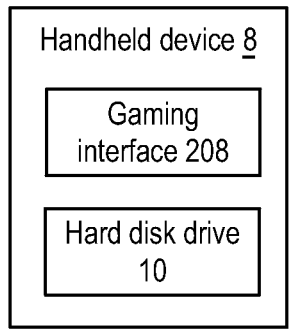
Fig. 6E
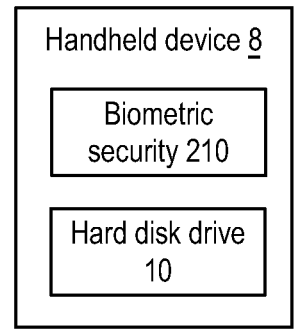
Fig. 6F
Fig. 6G
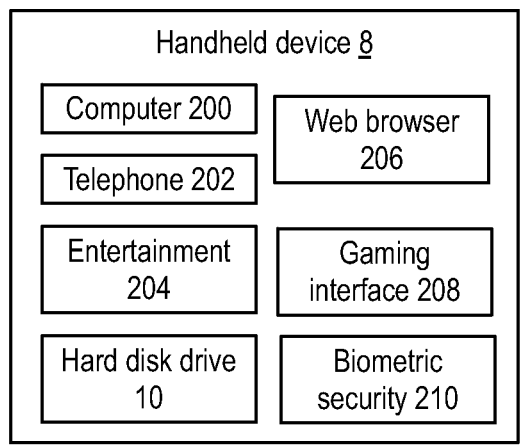

PARTIAL RIB EXTENDING FROM A HUB

TECHNICAL FIELD

This disclosure relates to the stiffening of the disk base by partial ribs to dampen mechanical vibrations in a hard disk drive and to handheld devices that include the disclosed hard disk drive. The partial ribs support the positioning of integrated circuits in the controller printed circuit board more readily than the full ribs of the prior art.

BACKGROUND OF THE INVENTION

Hard disk drives face severe challenges that continue to grow. The hard disk drives often comply with a form factor. The specification of a form factor dictates the external mechanical interfaces used to couple the hard disk drive to its host. These hosts may include personal entertainment systems, computers, and/or telephones that fit in a pocket of a shirt or purse and run on small batteries.

Meanwhile, the hard disk drives are often required to reliably store and access many Gigabytes (Gb) of data. These portable environments are subject to mechanical shocks, such as dropping a telephone onto a floor.

The embedded control system in a hard disk drive was often implemented as a printed circuit board positioned opposite the disk cavity and mounted on a disk base. This printed circuit board will be referred to herein as a controller printed circuit board. While the design of the controller printed circuit board was somewhat constrained by the disk drive form factor in the past, it was nonetheless a separate design task from the mechanical design of the hard disk drive.

The mechanical design of the prior art hard disk drives often included features built into the disk base to stiffen the disk base, and consequently the hard disk drive. The stiffening protected the hard disk drive from mechanical shocks such as being dropped. One commonly used feature is sometimes referred to as a rib. The rib typically ran from a spindle hub where the spindle motor shaft was positioned to an outer wall of the disk base. The disk base, particularly facing toward the controller printed circuit board, could be seen as a floor with an outer wall and a spindle hub, both rising from the floor, with the rib(s) running from the hub to the outer wall and also rising up from the floor.

Several things have changed over the last few years. A great deal of circuitry has been integrated into a few, relatively large integrated circuits. These integrated circuits have a large number of connections that the printed circuit board must provide for the hard disk drive to function.

The very small form factors for hard disk drives have forced the controller printed circuit board to impact the mechanism of the disk base, in that these integrated circuits must be accounted for in the floor plan of the disk base, making it much less possible to implement the ribs without disrupting the function of the controller printed circuit board. Somehow the hard disk drive must be configured to survive the statistically inevitable mechanical shocks, while supporting its required control functions and fitting into these very small form factors.

SUMMARY OF THE INVENTION

A disk base and a hard disk drive are disclosed and claimed with the disk base including a first face and a second face with at least one partial rib included in the first and/or second face. The partial rib(s) act to stiffen the disk base and hard disk drive from mechanical shocks while supporting the positioning of large integrated circuits on a controller printed circuit board that closely mates to the disk base near the second face. The first face forms at least part of a disk cavity.

The disk cavity houses a spindle motor coupled to at least one disk to create at least one rotating disk surface. The disk cavity also houses a voice coil motor configured to pivot about an actuator pivot to position the read-write head(s) over tracks on the rotating disk surfaces.

The first and the second face include a floor with an outer wall and a hub configured to receive the spindle motor. The first and/or second face include at least one partial rib. The partial rib extends part way from either the hub or the outer wall toward the other. The partial rib rises off the floor at least Ndeep percent of the height of the outer wall. Ndeep may be at least 50, 60, or 75 percent. The partial rib may be at least Nwide percent of the width of the disk base. Nwide may be at least 5, 10, or 15 percent. The partial rib may have any of a variety of shapes.

A handheld device is disclosed and claimed including at least one of the disclosed hard disk drives with improved reliability to mechanical shocks. The handheld device may include any combination of the following that may use the hard disk drive: a computer, a telephone, an entertainment system providing sound and/or visual presentation material, a web browser, a gaming interface and/or a biometric security component.

BRIEF DESCRIPTION OF THE DRAWINGS

FIGS. 6A to 6G shows some details of the handheld device including at least one of the disclosed hard disk drives with improved reliability to mechanical shocks as shown in FIG. 3.

DETAILED DESCRIPTION

This disclosure relates to the stiffening of the disk base by partial ribs to dampen mechanical vibrations in a hard disk drive and to handheld devices that include the hard disk drive. The partial rib(s) support the positioning of integrated circuits in the controller printed circuit board without the constraints of full ribs. The controller printed circuit board is mounted on the disk base opposite the disk cavity. The disk cavity houses the spindle motor that rotates the disks and the voice coil motor that positions the read-write head(s) over tracks on the rotating disk surface(s). The controller printed circuit board controls the spindle motor's rotation of the disks and the voice coil motor's positioning of the read-write head(s).

A hard disk drive is disclosed with a disk base including a first face and a second face. The first face and/or second face include at least one partial rib. The first face is configured to form part of a disk cavity. The second face is configured to support the positioning of at least one integrated circuit on a controller printed circuit board that mounts on this second face.

The disk cavity houses a spindle motor coupled to at least one disk to create at least one rotating disk surface. The disk cavity also houses a voice coil motor configured to pivot about an actuator pivot to position the read-write head(s) over tracks on the rotating disk surfaces.

Figure 1A:
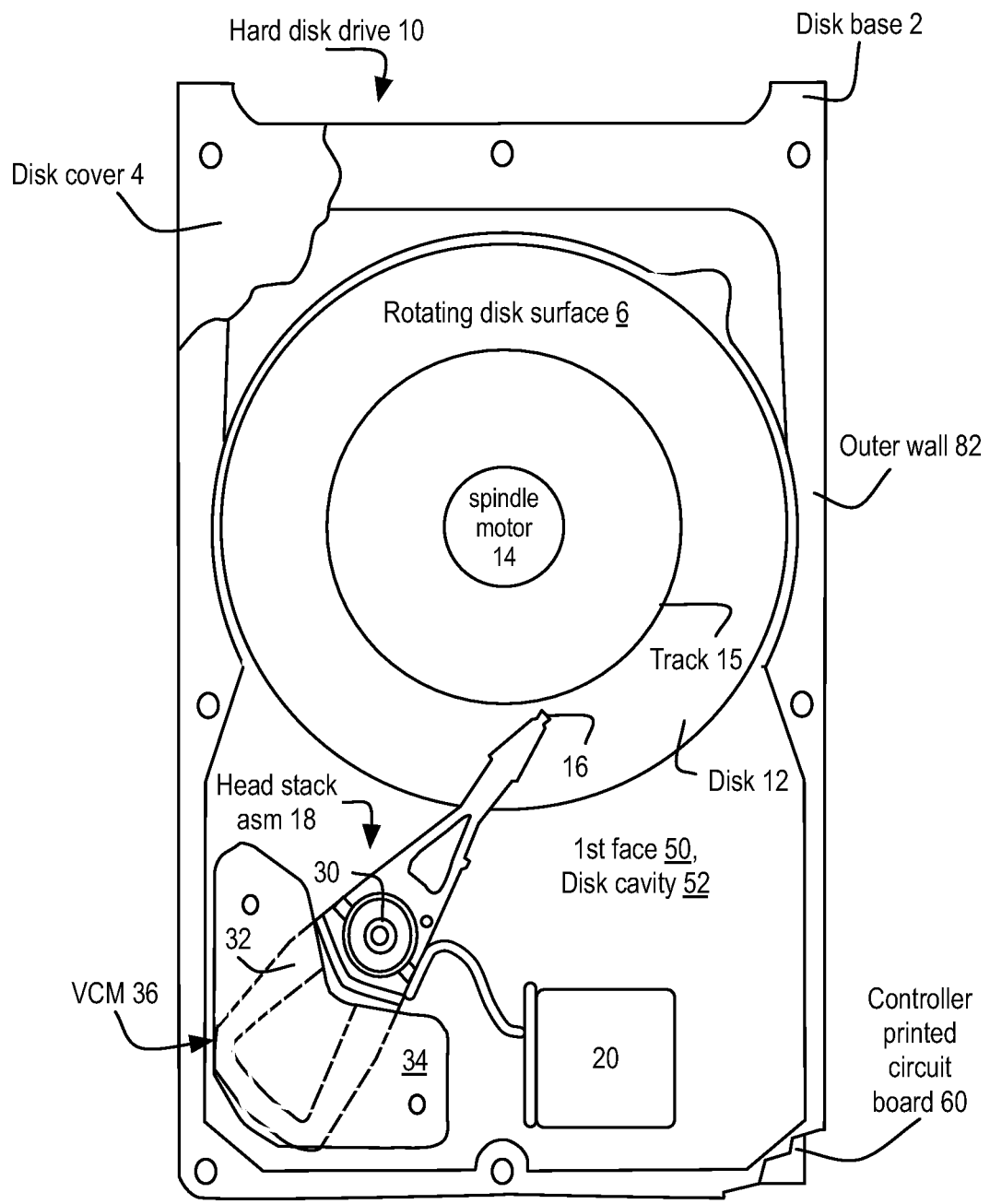
FIG. 1A shows an example embodiment of a hard disk drive that includes a disk base that includes a first face shown here and a second face shown with regards the prior art in FIG. 3A and in accord with the claimed elements shown in FIGS. 5A, 5C and 6A.
Figure 1B:
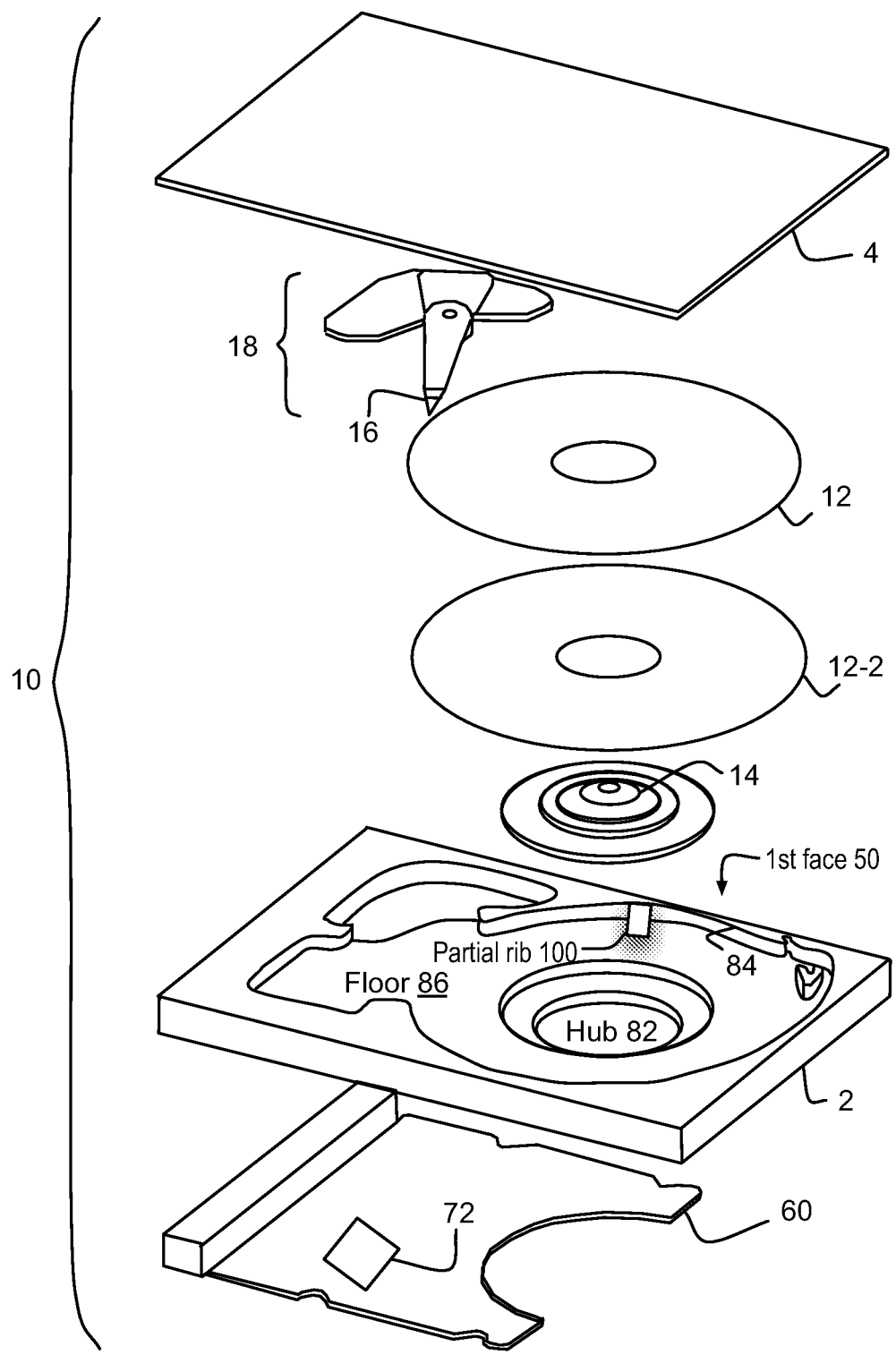
FIG. 1B shows an exploded view of the components of the hard disk drive of FIG. 1A, in particular some details of the first face of the disk base including at least one partial rib.
Figure 2B:
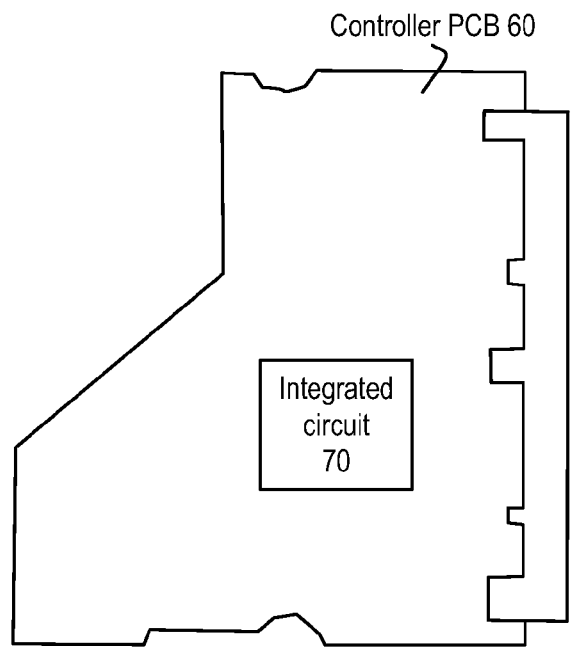
FIGS. 2A to 2C show a configuration of the second face of a prior art disk base.
Figure 3:
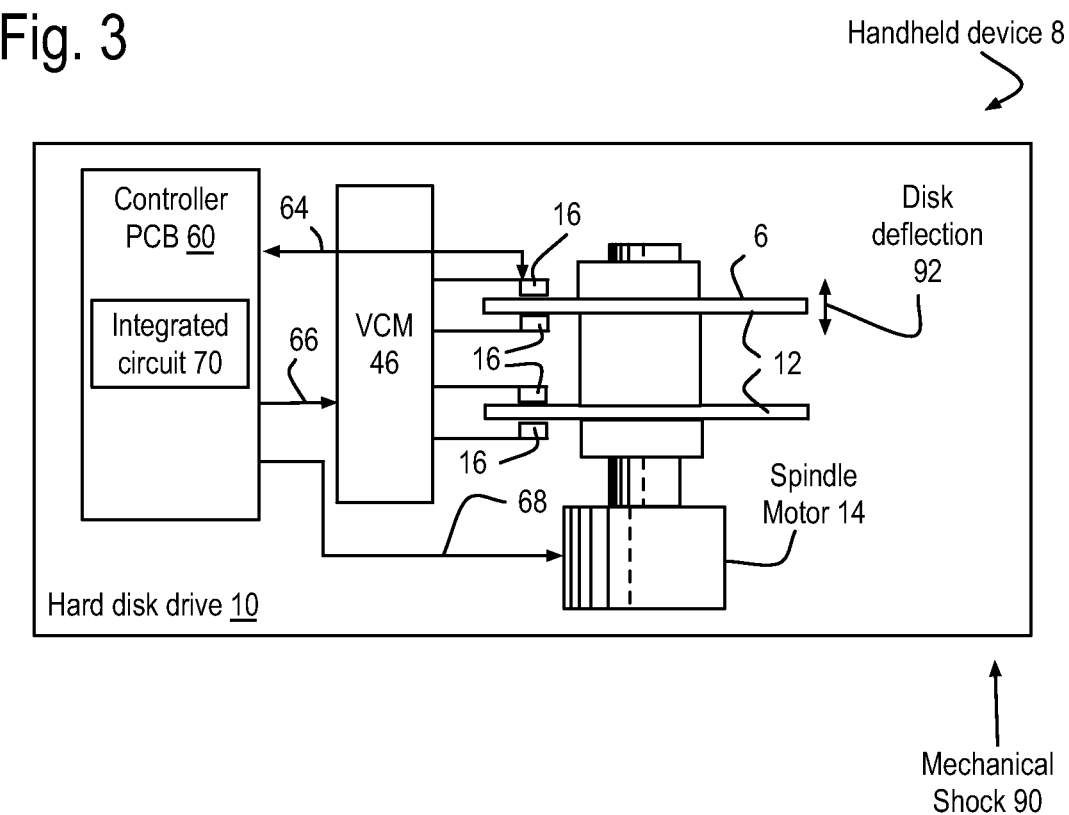
FIG. 3 shows a simplified schematic of a handheld device including the hard disk drive and some details of the hard disk drive experiencing a mechanical shock whose effects may be estimated by a disk deflection of the disk.
Figure 5A:
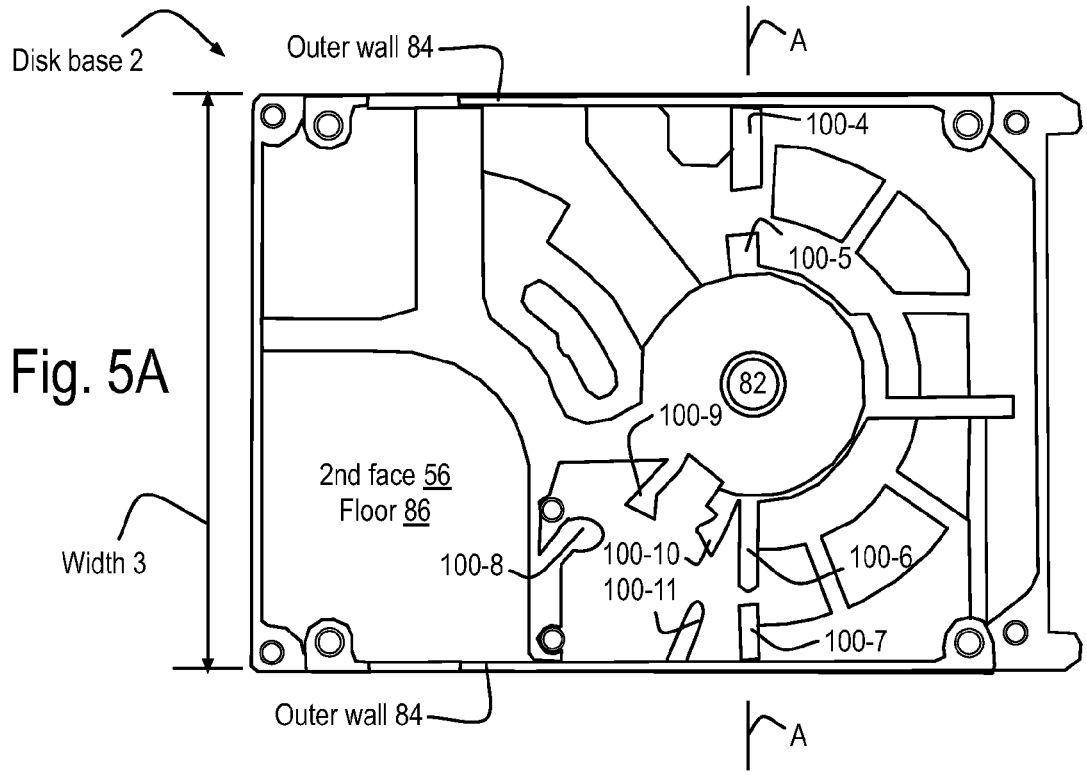
FIG. 5A shows an example second face of the disk base further including partial ribs arranged along a cross section A-A shown in FIG. 5B.

The first face 50 and/or the second face 56 are shown in FIGS. 1B, 5A and 6A to include at least one partial rib 100. The partial ribs 100 extend from the hub 82 or the outer wall 84 part of the way to the other, whereas ribs 6 extend from the hub 82 to the outer wall 84 as shown in FIG. 2B. The partial ribs 100 stiffen the disk base 2 from mechanical shocks 90 while supporting the placement of integrated circuits 70 on the controller printed circuit board 60 over them as shown in FIG. 3.

Referring to the drawings more particularly by reference numbers, FIG. 1A shows an example embodiment of a hard disk drive 10 that includes a disk base 2 that includes a first face 50 shown here and a second face 56 shown with regards to the prior art in FIG. 3A and in accord with the claimed elements shown in FIGS. 5A, 5C and 6A.

A spindle motor 14 may be mounted on the first face 50 of the disk base 2. The spindle motor 14 may be coupled to at least one disk 8 to create a rotating disk surface 6.

A voice coil motor 36 may be mounted on the first face 50 of the disk base 2 with its head stack assembly 18 coupling through an actuator pivot 30 to position at least one read-write head 16 near a track 15 on at least one of the rotating disk surfaces 6. The voice coil motor 36 pivots about the actuator pivot 30, moving in response to electrical stimulus of the voice coil 32 and its interaction with a fixed magnet assembly 34.

Communications between the read-write head 16 and other components of the head stack assembly 18 are often sent via an interface 20 to the controller printed circuit board 60 mounted on the second face 56 of the disk base 2, which is shown in FIG. 3A for the prior art and FIGS. 5A, 5C and 6A. The second face 56 is opposite the disks 12, the spindle motor 14 and the voice coil motor 36, which are housed in the disk cavity 52 surrounded by the outer wall 84. The first face 50 includes the disk cavity 52 and the outer wall 84.

A disk cover 4 is mounted on the disk base to enclose the disks 12, the spindle motor 14 and the voice coil motor 36.

The first face 50 and the second face 56 include a floor 86 with an outer wall 84 and a hub 82 configured to receive the spindle motor 14. The first face 50 and/or the second face 56 include at least one partial rib 100 as shown in FIGS. 1B, 5A and 6A. The partial rib 100 extends part way from either the hub 82 or the outer wall 84 toward the other.

FIG. 1B shows an exploded view of the components of the hard disk drive 10 of FIG. 1A, in particular some details of the first face 50 of the disk base 2 including at least one partial rib 100. The first face 50 includes a floor 86 with an outer wall 84 and a hub 82 configured to receive the spindle motor 14.

Figure 2A:
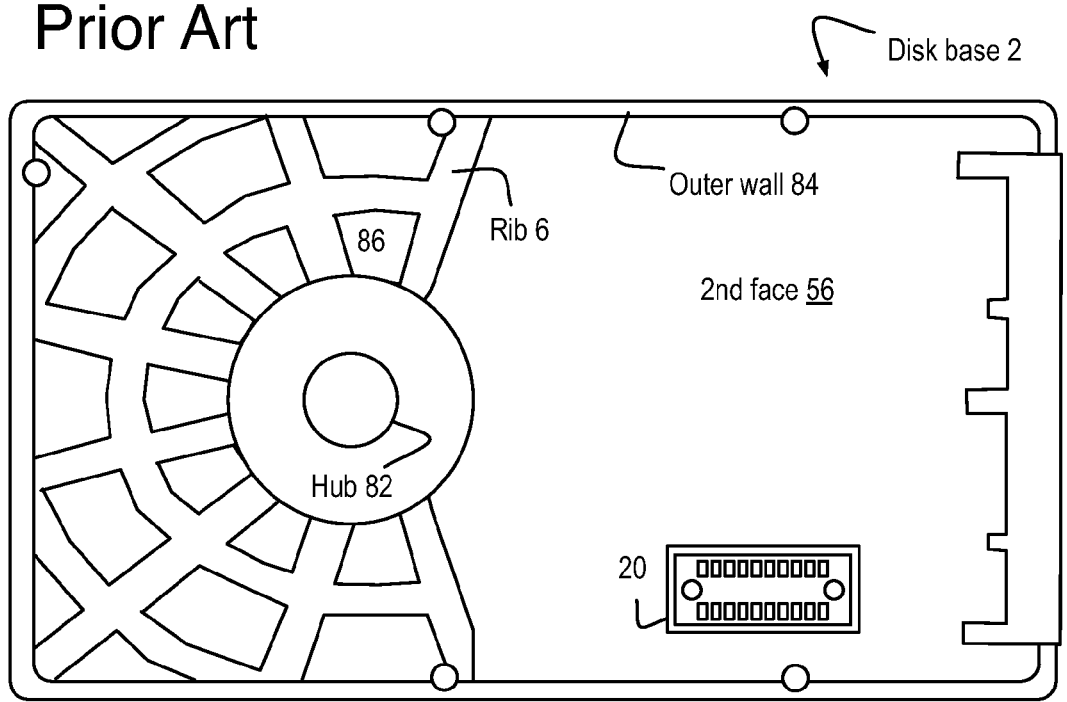
Figure 2C:
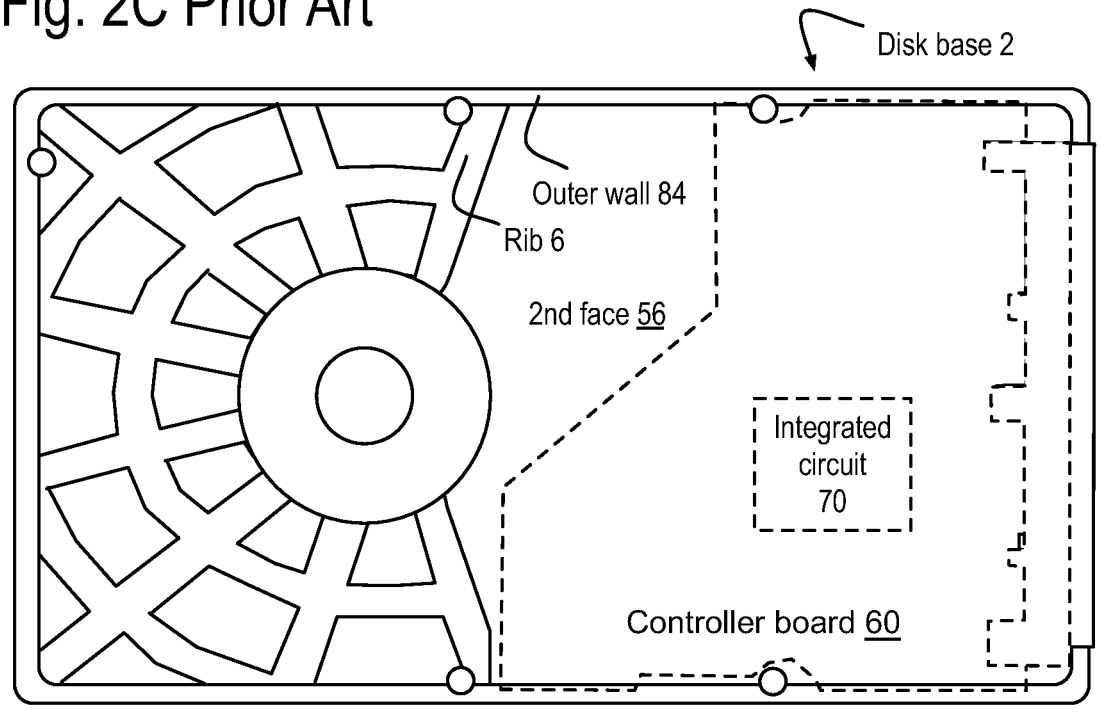

FIGS. 2A to 2C show a configuration of the second face 56 of a prior art disk base 2. FIG. 2A shows an example of the second face 56 of the disk base 2 with the interface 20 to the head stack assembly 18 typical of a three and one half inch hard disk drive 10. The hub 82 is surrounded by an outer wall 84 and several rays 6 rise off the floor 86. These ribs 6 extend from the hub 82 to the outer wall 84 as rays extending from a center in the hub 82 and often serve to stiffen the disk base 2. They have a problem, the controller Printed Circuit Board (PCB) 60 shown in FIG. 2B cannot be readily positioned over the ribs 6 and still support the integrated circuits 70 that control the hard disk drive 10. FIG. 2C shows the controller printed circuit board 60 mounted on the second face 56, confirming that these observations.

FIG. 3 shows a simplified schematic of some details of a handheld device 8 that includes the hard disk drive 10 experiencing a mechanical shock 90 whose effects may be estimated by a disk deflection 92 of the disk 12. This Figure also shows some of the operational relationships that are required of many embodiments of the controller PCB 60 and its integrated circuits 70. As used herein, the handheld device 8 is a device small enough that a small person can hold it in one hand. The handheld device 8 may be configured to clip or fasten unto a shirt, pocket, belt, pack and/or purse for normal use. It may include notebook computers and writing/reading pads, as well as telephones, game playing interfaces and personal or portable entertainment systems, which will be more thoroughly discussed with regards to FIGS. 6A to 6G shortly.

Returning to the hard disk drive 10 in FIG. 3, the controller PCB 60 is often coupled 66 to direct the voice coil motor 46 to position at least one read-write head 16 over at least one rotating disk surface 6 to access data in the track 15 shown in FIG. 1A. The controller PCB 60 may also be coupled 68 to direct the spindle motor 14 in the rotating of the disks 8 to create the rotating disk surfaces 6. The read-write head(s) 16 may be coupled 64 to the controller PCB 60 to support the reading and writing of data in the tracks 15 on the rotating disk surface(s) 6. In various embodiments of the hard disk drive 10, any of these functions may be supported in part or whole by one or more of the integrated circuits 70. It should be noted that in many hard disk drives 10, the read-write heads 16 are part of sliders that may include further capabilities for positioning the read-write heads 16 near the tracks 15, as well as possibly vertically positioning the read-write heads 16 over the rotating disk surface 6.

During the design process for the hard disk drive 10, it may be common to simulate the disk deflection 92 based upon a mechanical shock 90 being applied to the hard disk drive 10. These simulations may show what the size of the Non-Operational Shock (NOS) may be for the hard disk drive. The higher the NOS, the greater mechanical reliability may be inferred for the hard disk drive 10 built with the configuration of the disk base 2, its partial ribs 100 and coupled the controller PCB 60. In certain of these simulations hard disk drives 10 including one or more partial ribs 100 have been found to improve the NOS by several percent. This improves the reliability of a hard disk drive 10 built to that configuration of the disk base 2 and controller PCB 60.

These simulation results also indicate the reliability of the handheld device 8 including that hard disk drive 10 are improved when subjected to the mechanical shock 90. Examples of such mechanical shocks 90 include dropping the handheld device 8 and/or slamming the handheld device 8 into a wall or door.

Figure 4A:
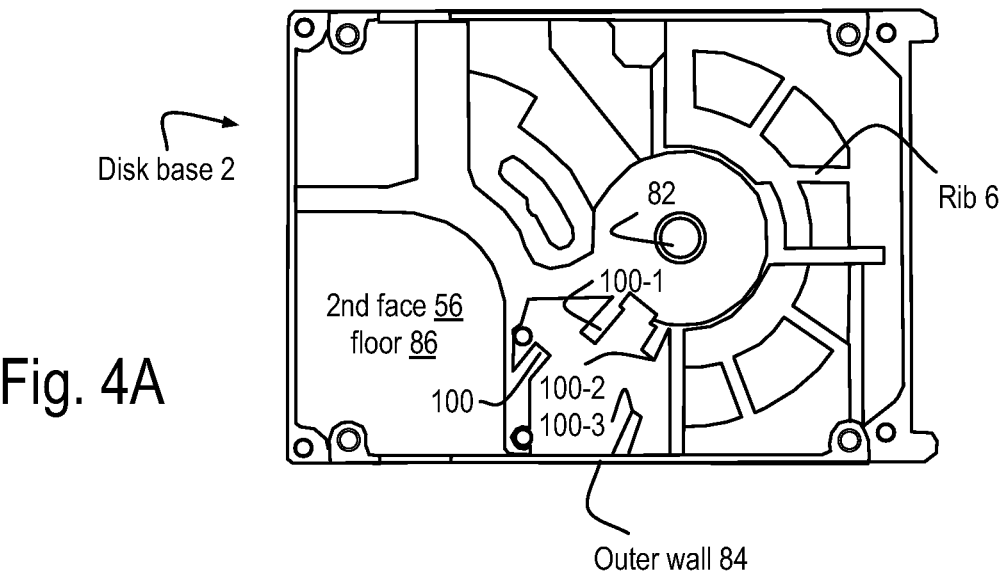
FIGS. 4A to 4C show an example second face of the disk base as claimed herein, the controller PCB with its integrated circuit configured for positioning amongst the partial ribs rising from the floor.
Figure 4B:
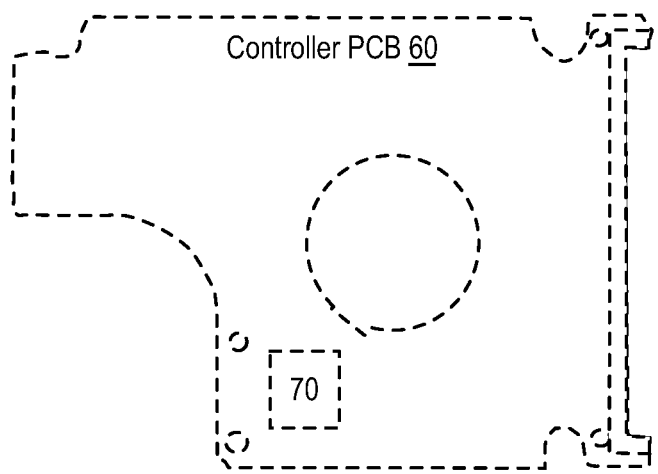
Figure 4C:
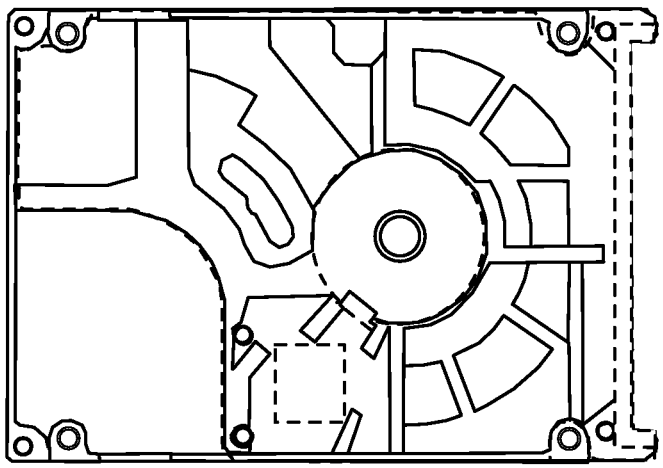

FIGS. 4A to 4C show an example second face 56 of a disk base 2 as claimed herein, the controller PCB 60 with its integrated circuit 70 configured for positioning amongst the partial ribs 100, 100-1, 100-2, and 100-3 rising from the floor 86. The partial ribs 100-1 and 100-2 extend from the hub 82 part way to the outer wall 84. The partial ribs 100 and 100-3 extend from the outer wall 84 partway to the hub 82. FIG. 4A shows the second face 56 including the partial ribs 100, 100-1, 100-2 and 100-3. FIG. 4B shows the controller PCB 60 including the integrated circuit 70. And FIG. 4C shows the disk base 2 coupled to the controller PCB 60.

Figure 5B:
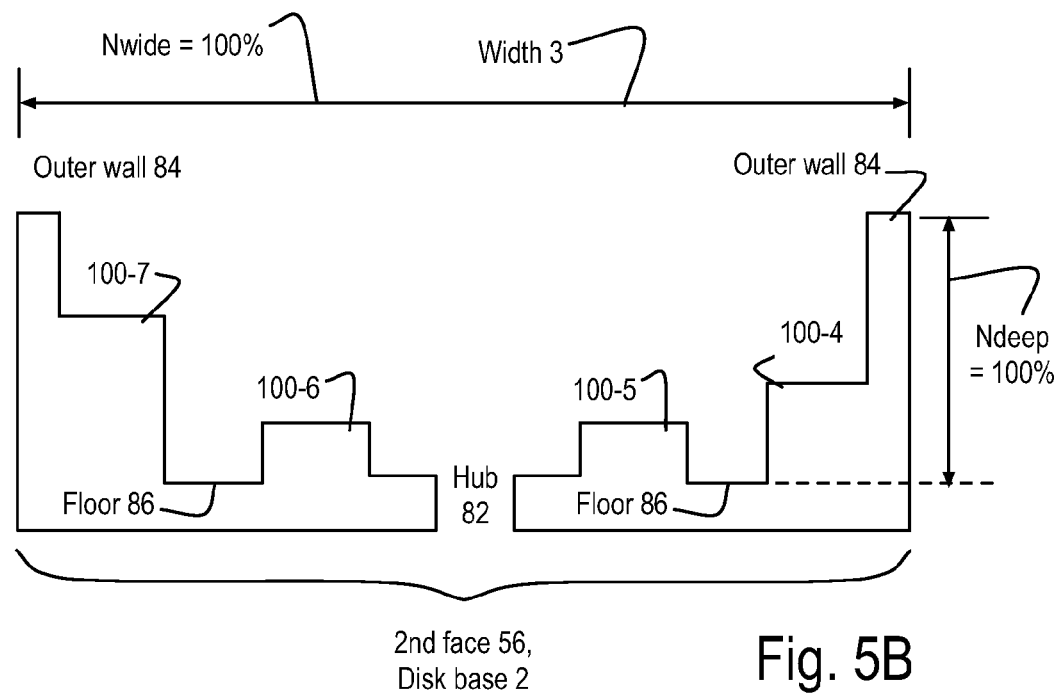

FIG. 5A shows an example second face 56 of the disk base 2 further including partial ribs 100-4, 100-5, 100-6 and 100-7 arranged along a cross section A-A shown in FIG. 5B. The disk base 2 of width 3 as measured from the outside of the outer walls 84 of the more narrow dimension. Note that if the hard disk drive 10 is essentially square from this view, the height and the width 3 are essentially the same.

FIG. 5B shows the partial ribs 100-4, 100-5, 100-6 and 100-7 rising off the floor 86 at least Ndeep percent of the height of the outer wall 84 above the floor 86. Ndeep is at least 50, perhaps 60, and further perhaps 75 percent of the height of the outer wall 84 above the floor 86. The partial ribs 100-4, 100-5, 100-6 and 100-7 may be at least Nwide percent of the width 3 of the disk base 2. Nwide is at least 5, perhaps 10, and further perhaps 15 percent of the width of the disk base 2.

Note that the partial rib as shown by 100, 100-1 to 100-11 may have any of a variety of shapes when seen from above the floor 86. These shapes may include, but are not limited to, a rectangle such as the partial ribs 100-4 and 100-7, possibly with a rounded end such as the partial rib 100-11, a filled curve such as the partial rib 100-8, and/or possibly forming a less continuous shape as shown by the partial rib 100-10.

FIGS. 6A to 6G shows some details of the handheld device 8 including at least one of the disclosed hard disk drives 10 with improved reliability to mechanical shocks 90 as shown in FIG. 3. The handheld device 8 may include any of the following that may use the hard disk drive 10: a computer 200 as in FIG. 6A, a telephone 202 as in FIG. 6B, an entertainment system 204 as in FIG. 6C, possibly providing sound and/or visual presentation material, a web browser 206 as in FIG. 6D, a gaming interface as in FIG. 6E, and/or a biometric security component 210 as in FIG. 6F. FIG. 6G shows that any combination of the components of FIGS. 6A to 6F may be included in the handheld device 8.

The computer 200 may include at least one data processor and at least one instruction processor with each data processor responding to instructions from at least one of the instruction processors. The computer 200 may use the hard disk drive to store and retrieve programs and/or data for use by the programs.

The telephone 202 may include a cellular phone and/or an interface to a wireline telephone, such as a Bluetooth interface. The hard disk drive 10 may be used to store phone messages, provide a phone book and/or help encrypt/decrypt the signals sent via the telephone 202.

The entertainment system 204 may provide not only sound and visual presentations that may at least in part be stored in the hard disk drive 10. The visual presentations may support multiple screens and/or multiple windows and/or three-dimensional displays.

The web browser 206 may interact through a Local Area Network (LAN), a wireless LAN (WLAN), a wireless interface such as Bluetooth to the LAN and/or the WLAN. The hard disk drive 10 may act as a download repository and/or browser cache or history repository.

The gaming interface 208 may include a haptic interface configured to provide tactile feedback, a joystick and/or push buttons and/or voice actuated command interfaces, any of which may use the hard disk drive 10. The hard disk drive 10 may also store or cache information regarding various scenes in the games, such as forests, rooms, and so on. The hard disk drive 10 may also store persona information for its user and other game players that may indicate their appearance, vocal characteristics, and game attributes such as magical or martial arts powers.

The biometric security component 210 may support fingerprint, voiceprint and/or retinal scan capabilities. The hard disk drive 10 may be used to house encryption/decryption tools and/or files as well as security templates for people authorized to use the handheld device 8.

The preceding embodiments provide examples of the invention, and are not meant to constrain the scope of the following claims.

What is claimed is:

1. An apparatus, comprising:
   a disk base including a first face and a second face;
   an outer wall surrounding a hub around said disk base wherein said hub is configured to mount a motor;
   at least one partial rib extending from one of said hub and said outer wall partway toward the other of said hub and said outer wall; and
   a circuit board mounted over said at least one partial rib.

2. The apparatus of claim 1, wherein said first face and said second face include a floor;
   wherein said partial rib rises off said floor toward said outer wall by at least Ndeep percent of said height of said outer wall above said floor, with Ndeep at least fifty percent.

3. The apparatus of claim 2, wherein at least one of said partial ribs rises said Ndeep greater than sixty percent.

4. The apparatus of claim 3, wherein at least one of said partial ribs rises said Ndeep greater than seventy five percent.

5. The apparatus of claim 1, wherein said partial rib has a width of at least Nwide percent of the width of said disk base, with said Nwide at least five percent.

6. The apparatus of claim 5, wherein at least one of said partial rib has the width of Nwide percent at least ten percent.

7. The apparatus of claim 6, wherein at least one of said partial rib has the width of Nwide percent at least fifteen percent.

8. The apparatus of claim 1, wherein a shape of said partial rib is rectangular.

9. The apparatus of claim 1, wherein a shape of said partial rib includes a rounded end.

10. An apparatus, including:
    at least one hard disk drive configured to withstand a mechanical shock based upon at least one partial rib in a disk base extending from a hub configured to mount a spindle motor or an outer wall surrounding said hub and extending partway to the other of said hub and said outer wall, wherein said at least one partial rib extends between said disk base and a controller printed circuit board mounted to said disk base.

11. The apparatus of claim 10, further comprising at least one member of a group consisting of:
    a computer, a telephone, an entertainment system, a web browser, a gaming interface and a biometric security component, with at least one of said members using said hard disk drive.

* * * * *